United States Patent [19]
Kendziora et al.

[11] 3,982,887
[45] Sept. 28, 1976

[54] FLUX-FREE SOLDERING OF ALUMINUM-CONTAINING WORKPIECES IN A CONTROLLED ATMOSPHERE

[75] Inventors: Heinz Kendziora, Bonn; Johannes Nenner, Bornheim-Merten; Heinz Schoer, Alfter; Werner Schultze, Bonn, all of Germany

[73] Assignee: Vereinigte Aluminium-Werke Aktiengesellschaft, Bonn, Germany

[22] Filed: Oct. 31, 1973

[21] Appl. No.: 411,383

[30] Foreign Application Priority Data
Nov. 9, 1972 Germany............................ 2254769

[52] U.S. Cl................................ 432/128; 432/152; 432/242; 432/244
[51] Int. Cl.² ............................................. F27B 9/02
[58] Field of Search ........... 432/128, 146, 148, 152, 432/242, 244

[56] References Cited
UNITED STATES PATENTS

| | | |
|---|---|---|
| 802,517 | 10/1905 | Kugel .................................. 432/128 |
| 2,033,331 | 3/1936 | DeCoriolis et al. ................. 432/128 |
| 3,464,681 | 9/1969 | Olivotto ............................. 432/244 |
| 3,656,720 | 4/1972 | Westeren et al. ................... 432/244 |

*Primary Examiner*—John J. Camby
*Attorney, Agent, or Firm*—Michael J. Striker

[57] ABSTRACT

A furnace for flux-free soldering of aluminum-containing workpieces in a controlled atmosphere has a furnace chamber through which workpieces to be soldered are made to travel. The furnace chamber itself is a gas-tight metallic muffle which is thermally insulated from the outer part of the furnace and has an inlet for the workpieces and an outlet for them. A first lock chamber is interposed between the furnace chamber and the inlet, and a second lock chamber is interposed between the outlet and the furnace chamber. Arrangements are provided for admitting vacuum and protective gas into the lock chambers, and protective gas into the muffle and a heating arrangement is provided for heating the controlled atmosphere in the muffle.

12 Claims, 4 Drawing Figures

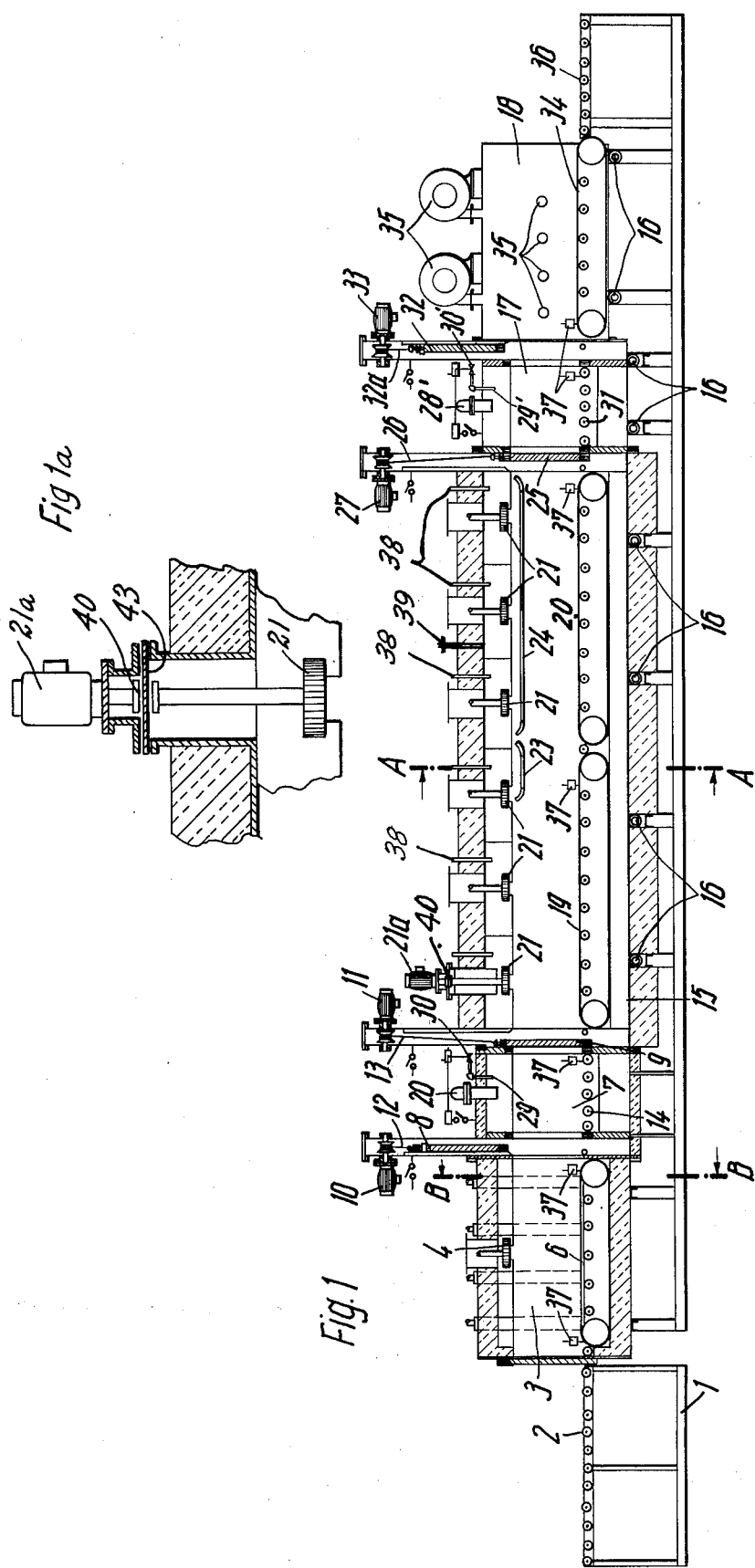

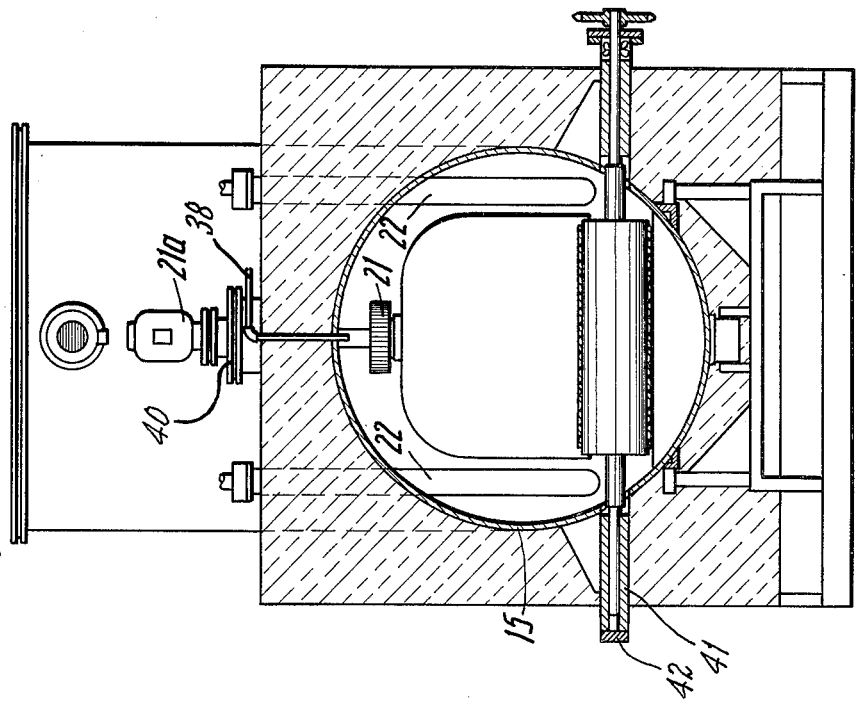
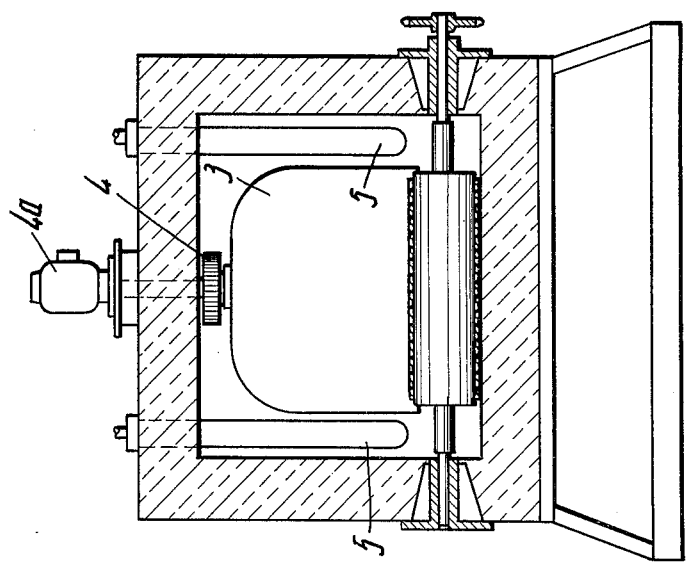

FLUX-FREE SOLDERING OF ALUMINUM-CONTAINING WORKPIECES IN A CONTROLLED ATMOSPHERE

BACKGROUND OF THE INVENTION

The present invention relates generally to the soldering of aluminum-containing workpieces, and more particularly to the flux-free soldering of such workpieces in a controlled atmosphere. In particular, the invention relates to a furnace for flux-free soldering of aluminum-containing workpieces in a controlled atmosphere, and a method of carrying out such soldering.

The conventional way of soldering aluminum workpieces and those which contain aluminum is to use flux of one of the well known types. It is known from the prior art to effect flux soldering of aluminum-containing workpieces in furnaces which are constructed as air-circulating furnaces. These furnaces must be largely constructed of ceramic materials because other materials are strongly attacked by the flux substances. Another approach from the prior art is to solder in metallic furnaces which do not require the use of ceramic materials, and wherein the soldering is carried out in a high vacuum. However, this type of furnace cannot be used for soldering without flux and under a protective gas atmosphere. The reason is that in this latter type of furnace, which must be heated by radiation, the outer wall is constructed as a water-cooled double wall against which heat radiation is directed. This principal cannot be used in furnaces using a protective gas atmosphere because otherwise the heated protective gas would predominantly yield its heat to the water-cooled wall of the furnace rather than to the workpieces.

SUMMARY OF THE INVENTION

It is a general object of the present invention to overcome the disadvantages of the prior art, and to permit flux-free soldering of aluminum-containing workpieces in a controlled atmosphere.

More particularly, it is an object of the present invention to provide an improved furnace for flux-free soldering of aluminum-containing workpieces in a controlled atmosphere.

Another object of the invention is to provide a method of carrying out such flux-free soldering of aluminum-containing workpieces in a controlled atmosphere.

In keeping with the above objects, and with others which will become apparent hereafter, one feature of the invention resides in a furnace for flux-free soldering of aluminum-containing workpieces in a controlled atmosphere. Briefly stated, this comprises a combination of wall means defining a furnace chamber through which workpieces to be soldered are to travel. The furnace chamber is a gas-tight metallic muffle, being thermally insulated from the outer part of the furnace and being adapted to contain such workpieces in a controlled atmosphere. The muffle has an inlet for the entry of the workpieces and an outlet for the exit of the treated or soldered workpieces. A first lock chamber is interposed between the furnace chamber and the inlet, and a second lock chamber is interposed between the furnace chamber and the outlet. Admitting means is provided for admitting vacuum and protective gas into the lock chambers and protective gas into the muffle and heating means is provided for heating the controlled atmosphere in the muffle.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawing.

BRIEF DESCRIPTION OF THE DRAWING

FIG. 1 is a somewhat diagrammatic vertical longitudinal section through a furnace according to the present invention;

FIG. 1a is a vertical section of a detail of FIG. 1, drawn at an enlarged scale;

FIG. 2 is a section taken on line A—A of FIG. 1; and

FIG. 3 is a section taken on line B—B of FIG. 1.

DESCRIPTION OF THE PREFERRED EMBODIMENTS

Referring firstly to FIG. 1, it will be seen that the workpieces to be soldered, which are aluminum workpieces or aluminum-containing workpieces and are not specifically illustrated, are supplied via a charging table 1 provided with rollers 2 on which the workpieces are rolled until they enter a preheating chamber 3. Located in the preheating chamber 3 is a blower 4 which is driven by a motor 4a (see FIG. 3) and which serves to provide for uniform circulation of air in the chamber 3. This air has been heated by electrical heating elements 5 which are also most clearly shown in FIG. 3.

The workpieces to be soldered pass from the rollers 2 onto a conveyor 6 which advances them (towards the right in FIG. 1) into a lock chamber 7. The lock chamber 7 has gates 8 and 9 which can be raised and lowered via motors 10 and 11 and ropes or similar elements 12, 13 which are connected with the motors 10 and 11 and with the respective gates. A set of roller 14 is arranged in the lock chamber 7 to permit advancement of the workpieces to travel trhough the lock chamber 7 and into a gas-tight metallic muffle 15. The muffle may advantageously be made of steel and is in itself known from muffle furnaces which have long been used in the steel producing industry. At the other end of the muffle 15 there is arranged a further lock chamber 17 through which the soldered workpieces are discharged into a cooling chamber 18. To accommodate movements of the muffle 15 and of the metallic lock chamber 17 which result from thermal expansion or contraction of their material, the muffle 15 and the lock chamber 17 are mounted on rollers 16.

When the workpieces entei the muffle 15 they move onto conveyors 19 and 20 on which they travel through the muffle towards the lock chamber 17. On the conveyor 19 the workpieces are preheated until they are just below the soldering temperature, and the actual soldering operation takes place when the workpieces then move onto the conveyor 20.

Reference numerals 21 designate blowers which are operated by motors 21a (only one shown), and details of this arrangement are also visible in FIG. 2. That Figure also shows that heating elements 22 extend gas-tightly into the muffle 15 in order to permit heating of the protective-gas atmosphere which exists in the muffle 15 and which is constantly being circulated within the same by the blowers 21. The protective gas is introduced into the muffle by pipes 38 and the pressure in the muffle is controlled by a valve 39. A temperature measuring rail 23 is provided for determining the temperature of the workpieces to be soldered, and for controlling the speed of movement of the conveyor 19 in response to the measured temperature. A further similar device 24 controls in the same manner the actual soldering operation which takes place on the conveyor 20.

Gates 25 and 32 are provided, of which the former connects the outlet end of the muffle 15 with the lock chamber 17, whereas the gate 32 connects the interior of the lock chamber 17 with the furnace chamber in general, and in particular with the cooling zone or chamber 18. The gates 25 and 32 can be raised and lowered via ropes or the like 26 and 32a which are operated by motors 27 and 33, respectively.

The lock chamber 7 is provided with an inlet 28 and the lock chamber 17 with an inlet 28', and in both cases these serve to evacuate the lock chambers. Conduits 29 and 29' are provided, which can be opened or closed by means of valves 30, 30' and which permit the introduction of protective gas into the lock chambers 7, 17.

When the soldered workpieces enter the lock chamber 17, they are transported through the same on rollers 31 and, when the gate 32 has been raised via the motor 33, they can then enter into the chamber 18. It will be appreciated that the gate 32 is raised only when the gate 25 is in lowered closed position, which is, of course, also true with respect to the gates 8 and 9 of the lock chamber 7.

During passage through the zone or chamber 18, the soldered workpieces travel on a conveyor 34 and are permitted to cool down. If it is desired to provide a sudden cooling of shock-like nature, for instance by directing an air blast against the workpieces, then blowers 35 may be turned on which are provided for this purpose in the zone 18. Finally, the workpieces move onto the rollers 36 and are conveyed away to be removed. The passage of the workpieces through the entire furnace may be controlled in various ways, for instance by means of the light-beam sensors 37 which are shown only diagrammatically.

A particular advantage of the furnace according to the present invention is the fact that no ceramic materials whatsoever are required for the interior of the furnace. This advantage results from the fact that ceramic materials have considerable capability of absorbing oxygen and moisture, which brings with it the danger that the protective atmosphere of the furnace, and in particular the muffle 15, might be contaminated. Insofar as any insulating material is used in the furnace according to the present invention, there is no connection whatsoever between such material and the interior of the muffle 15. This is important because it excludes the possibility thay any gaseous contaminants adhereing to or in some fashion resulting from such insulating material, might enter into the muffle 15 and contaminate the protective atmosphere therein. All ceramic materials, as well as asbestos and mineral wool are to be completely avoided in the interior of the muffle 15, be it as structural components, as packings, as sealing elements or the like.

Moreover, it has been found that grease, oil and vapor products thereof, as well as particles which are worn off rubber or synthetic plastic, such as off sealing elements of such materials, also disadvantageously influence the soldering process if the soldering is carried out without flux. For this reason it is particularly advantageous if all seals which are required where shafts or the like for blowers, transporting rollers or the like pass through the wall of the furnace or of the muffle 15 into the interior of the latter, are metallic seals to the extent possible. No additional lubrication is to be used, and no sealing elements of rubber, synthetic plastic or the like are to be employed. Rather, the gap which will inevitably exist between the respective shafts or the like and the metal of the wall of the muffle 15, is to be sealed by blowing a protective gas through pipes 38 into the muffle, so that the gas will in part escape through such gap and prevent entrance of air into the muffle. Alternately, the walls of the muffle 15 need not be perforate at all, and instead drive shafts or the like can have a first portion located outside the wall 43 and a second portion located inwardly of the wall within the interior of the muffle 15, in which case a magnetic coupling 40 is utilized as best shown in FIG. 1a which permits transmission of motion from the outer driving section of the respective shaft to the inner driven section through the solid wall 43 without having to provide any opening in the wall at all. If any shaft or shaft portions extend through the wall into the interior of the muffle 15, which are not operated by motors, it is advantageous if they are encapsulated 41, by a sleeve 41 closed at the outer end by a cover 42 connected by screws or the like to the outer end of the sleeve, as best shown in FIG. 2. Seals which may for instance be required between the lock chambers 7, 17 and the furnace chamber or the outer ambient atmosphere, can advantageously be made of silicone rubber if they are properly cooled. If stationary components are to be sealed, as opposed to components which move, then the seal is advantageously of a metallic nature.

Conduits or hoses which supply the protective gas must not be of rubber or synthetic plastic material, such as for instance polyvinyl chloride. such materials are not suitable because their use would involve the danger that the protective gas itself would become contaminated by oxygen which diffuses through the material of the conduits or hoses. It is therefore necessary to use metallic conduits or hoses, for instance made of copper, and any conduit sections which are to be connected with one another must, of course, be gas-tightly connected, preferably by means of soldering or welding.

The furnace according to the present invention makes possible a flux-less soldering of aluminum or aluminum-containing workpieces without any interference and difficulties. It is possible to establish in the novel furnace a protective gas atmosphere with an oxygen content which is low enough, and with a dew point which is low enough, and to maintain these features. This permits an increase in the thickness of the oxide layer, or an oxidation of the solder at its point of connection with the workpieces, from being prevented during the soldering operation. For economic reasons it is advantageous to use as the protective gas a liquid purified nitrogen, which is commercially available and in its commercial form already contains less than 5 ppm $O_2$ and has a dew point of lower than −60°C. Of course, other protective gases of appropriate purity, such as for instance argon, can also be utilized.

The workpieces themselves of course absorb air and moisture. It is undesirable that they be able to carry this absorbed air and moisture into the furnace, and particularly into the muffle, because this would undesirably contaminate the protective atmosphere. To avoid this, we have found it to be advantageous to make the lock chamber 7, through which the workpieces enter into the muffle 15, heatable so that the workpieces can be preheated to at least 100°C in the lock chamber 7 before they enter the muffle 15.

Quite surprisingly it has been found that independently of the thus far discussed furnace construction it is without disadvantage for the soldering without flux, if the workpieces to be soldered are preheated prior to entry into the lock chamber 7, in an air furnace, for instance an electrically heated air furnace, to a temperature up to a maximum of 500°C. If this is done, heating of the lock chamber 7 itself is not absolutely necessary. Moreover, the dwell time required for the workpieces in the protective gas atmosphere of the muffle 15, and thereby the axial length of the muffle 15, can be reduced if the workpieces are so preheated.

The heating of the protective gas itself can be carried out in suitable manner, advantageously electrically. Of course, other types of heaters can also be used, for instance gas heating. It is also advantageous if the heated protective gas is circulated and kept in motion by blowers, to obtain a uniform temperature in the interior of the muffle 15, and to provide for a better and more uniform heating of the workpieces, particularly of larger workpieces.

The workpieces themselves can be directly measured as to their temperature, for instance by means of a measuring device. This type of device serves for thermal electric measurement of the temperature of one or more workpieces traveling through a furnace. It involves the mounting of a desired number of thermal elements in form of wires, rods or rails which are located in the particular zone of the furnace wherein the temperature of the workpiece or workpieces is to be measured and which extend in the direction of the moving workpiece. These thermal elements are insulated with respect to the muffle 15 as well as with reference to one another, and either the positive or the negative arm is provided only once, whereas the arm with the other potential is provided as many times as temperature-measuring locations are desired. One end of the material of the thermal elements extends out of the muffle, being insulated to prevent entry or escape of atmosphere, and is connected with devices which readout the measured information. Such devices may be in form of a temperature measuring or registering arrangement.

This manner of measuring the temperature of the workpieces in the sealed muffle 15 is particularly advantageous because it permits the quantity of discards (i.e., workpieces which have not been properly soldered due to being at improper temperatures) to be maintained very small. This is especially true if successive ones of the workpieces differ in size and/or configuration. Moreover, this type of arrangement can be used for controlling the speed at which the workpieces pass through the muffle, for instance in that the temperature which is obtained at the end of the preheating zone is measured and is used—if the actual temperature differs from a preselected reference value—to increase or decrease the speed at which the workpieces move through the muffle 15, or even to temporarily stop such movement. In fact, this control principal makes it possible to very precisely coordinate the length of the furnace, and in particular of the muffle 15, with the number and configuration of the workpieces to be soldered. Especially if small numbers of workpieces are involved, a very short muffle 15 with only a single temperature zone may be utilized, in which case the preheated workpieces are soldered in the protective atmosphere of the muffle while being stationary, rather than while traveling. Of course, preheating, entry of the materials through the lock 7 and exit of the soldered workpieces through the lock 17, would be the same as previously described.

If hardenable alloys are used as core workpieces, it is advantageous to rapidly cool the workpieces quite quickly after the soldering has taken place. To prevent distortions in the shape of the workpieces due to excessively rapid cooling, cooling with water should be foregone, and cooling with gas should be employed if the cooling is carried out while the workpieces are still in the protective atmosphere, for instance of the lock chamber 17. It is, however, economically more advantageous if the cooling is carried out only after they have left the lock chamber 17, because then it is possible to use simply air for cooling purposes. If cooling is carried out within the lock chamber 17, then it is necessary to use a cooled protective gas, for instance nitrogen, because otherwise excessive contamination of the protective atmosphere by moisture or by oil vapors might take place if compressed air were used, and this would require prolonged withdrawal of the atmosphere from the chamber 17 and subsequent cleaning of the chamber before operations could be continued. Instead of containing a protective gas, the chamber 7 could be evacuated prior to opening of gate 9.

It will be understood that each of the elements described above, or two or more together, may also find a useful application in other types of constructions differing from the type described above.

While the invention has been illustrated and described as embodied in the flux-free soldering of aluminum-containing workpieces in a controlled atmosphere, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from he standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a furnace for flux-free soldering of aluminum-containing workpieces in a controlled atmosphere, a combination comprising wall means defining a furnace chamber through which workpieces to be soldered are to travel, said furnace chamber being constituted by a gas-tight thermally insulated metallic muffle and adapted to contain such workpieces in a controlled atmosphere, said muffle having an inlet and an outlet for the entry and exit of workpieces, respectively; a first lock chamber connected to said inlet, and a second lock chamber connected to said outlet; means connected to each lock chamber for creating a vacuum therein; admitting means for admitting a protective gas into said lock chambers and said muffle; first heating means for heating the interior of said first lock chamber; and second heating means for heating the protective gas atmosphere in said muffle.

2. A combination as defined in claim 1, wherein said muffle and lock chambers are formed by gas tight metallic walls.

3. A combination as defined in claim 1; and further comprising mounting means mounting said muffle and said second lock chamber for limited displacement in and relative to said furnace chamber.

4. A combination as defined in claim 3, wherein said mounting means comprises roller means.

5. A combination as defined in claim 1, wherein said admitting means comprises metallic conduits composed of conduit sections which are metallically sealingly connected with one another.

6. A combination as defined in claim 1; further comprising shaft means extending from the exterior of said furnace into said furnace chamber and including shafts which are not operated by a motor; and further comprising cover means encapsulating such portions of the non-operated shafts as extend into said furnace chamber.

7. A combination as defined in claim 1; further comprising shaft means extending from the exterior of said furnace into said furnace chamber and including rotatable shafts, said wall means having openings through which said shafts extend with sufficient clearance to permit rotation; and further comprising means for directing a protective gas into the respective clearance to thereby seal said furnace chamber with reference to the exterior of said furnace.

8. A combination as defined in claim 1; further comprising shaft means including first rotatable shaft portions located outside said furnace chamber, and cooperating second shaft portions located inside said furnace chamber and each separated from the respective first shaft portion by said wall means; and further comprising magnetic coupling means coupling said second shaft portions for rotation with the respective first shaft portion in the absence of physical contact between them.

9. A combination as defined in claim 1, wherein said furnace gas-tight muffle and lock chambers are free of ceramic materials.

10. A combination as defined in claim 1, and including blower means in said muffle for constantly circulating the protective gas atmosphere therein.

11. A combination as defined in claim 1, and including driven transporting means for transporting said workpieces through said muffle.

12. A combination as defined in claim 11, and including temperature sensing means for sensing the temperature of the workpieces as they are transported by said transporting means through said muffle.

* * * * *